Aug. 3, 1948.   F. T. COURT   2,446,263
CHANGE GEAR TRANSMISSION
Filed Jan. 9, 1945   3 Sheets-Sheet 1

INVENTOR.
FRANK T. COURT

ATTORNEYS

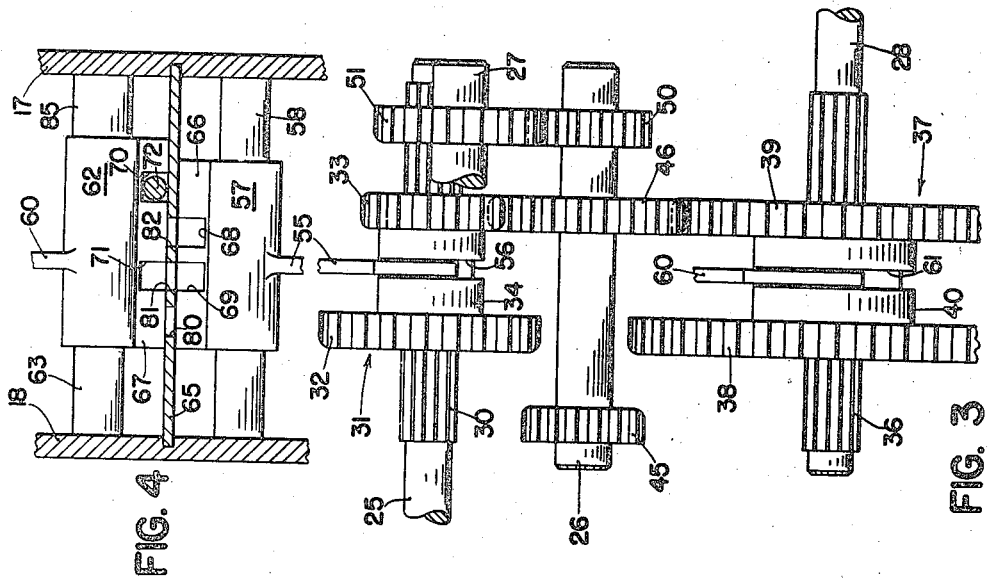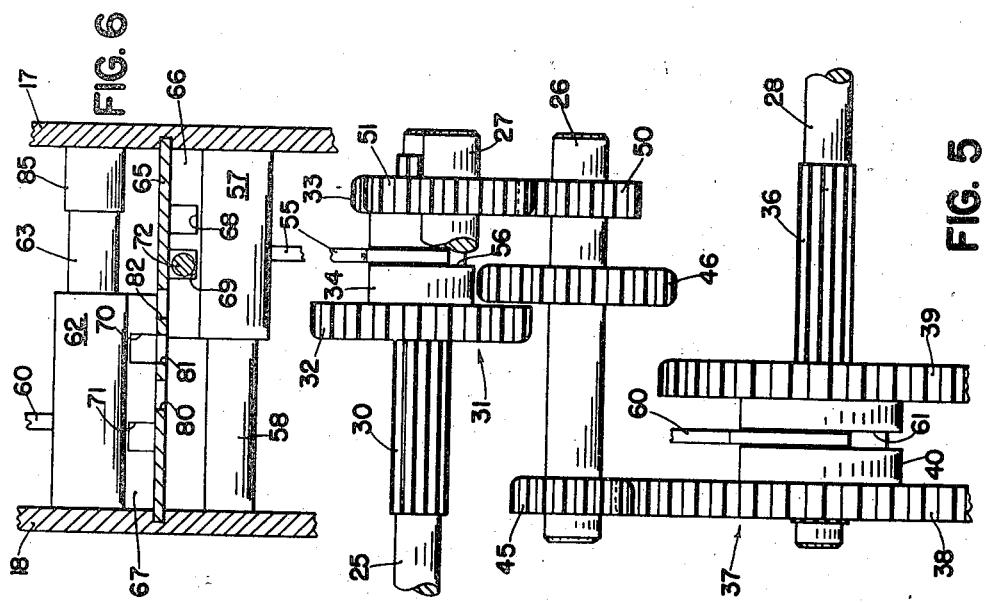

Aug. 3, 1948.    F. T. COURT    2,446,263
CHANGE GEAR TRANSMISSION
Filed Jan. 9, 1945    3 Sheets-Sheet 3
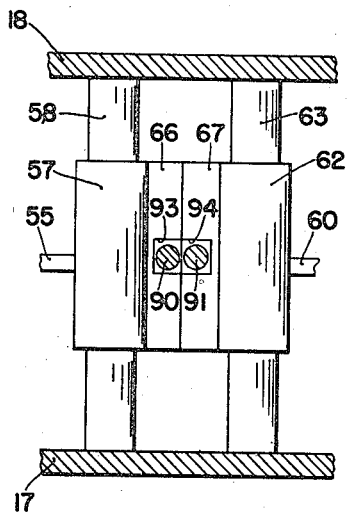
FIG. 7
FIG. 8
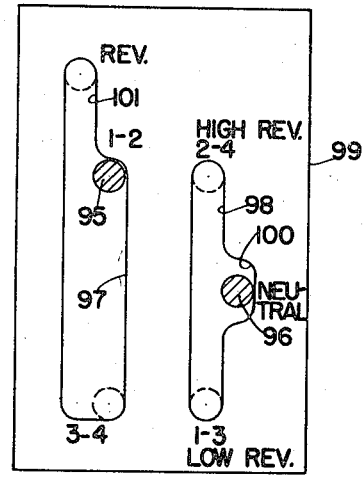
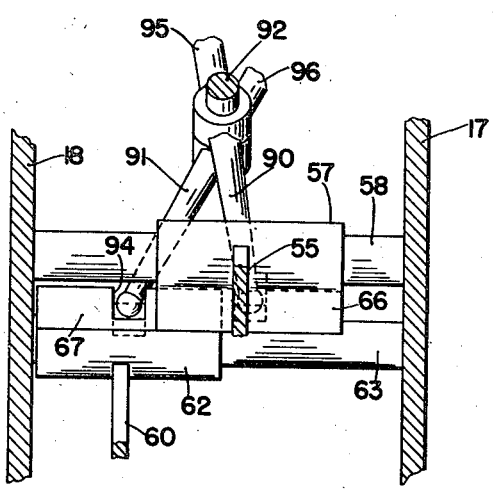
FIG. 9
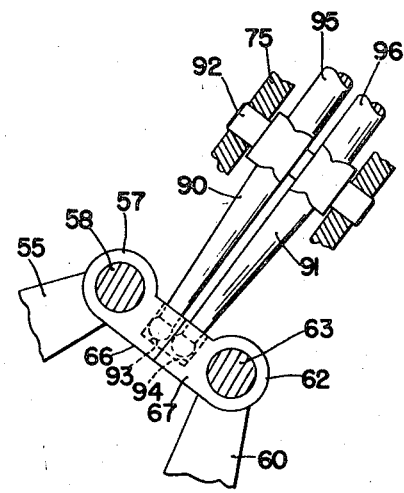
FIG. 10
*INVENTOR.*
FRANK T. COURT
ATTORNEYS Patented Aug. 3, 1948

2,446,263

UNITED STATES PATENT OFFICE 2,446,263

CHANGE GEAR TRANSMISSION

Frank T. Court, Moline, Ill., assignor to Deere & Company, Moline, Ill., a corporation of Illinois Application January 9, 1945, Serial No. 571,973

14 Claims. (Cl. 74—342)

1

The present invention relates generally to power transmitting mechanism and more particularly to change gear transmission. The principal object of my invention relates to the provision of a change gear transmission employing fewer gears for a given number of speed changes than was heretofore known to those skilled in the art. In the preferred embodiment of my invention, shown and described herein, I have obtained four gear ratios forward and two gear ratios in reverse, employing a total of only eight gears. Thus, due to the minimum number of gears used and also due to the design in which no coaxially arranged shafts are used, the transmission is simpler, less expensive, and more efficient than conventional transmissions, for an equal number of speed changes.

Another feature of my invention resides in the use of two gear shift levers for shifting the gears of the transmission, the levers being disposed closely together and side by side for movement either simultaneously or independently through equal ranges of movement for the four speeds forward. Thus, most gear changes from one speed to another can be accomplished by either shifting only one lever from one position to another or shifting both levers simultaneously, using one hand, the shifting being accomplished by straight fore and aft movement of the levers without the necessity for any transverse movement during the shifting operation.

Another object relates to the provision of a single shifting lever, in another embodiment of my invention, in which a large number of speed changes are accomplished by means of only two shiftable members. In this connection it is a further object of my invention to provide a guide wall or plate between the two shiftable members, with openings or gates to insure that the control lever travels in a proper path in moving from one speed combination to another.

These and other objects and advantages of my invention will be apparent to those skilled in the art after a consideration of the following description, in which reference is had to the drawings appended hereto, in which Figure 1 is a side elevational view of a change gear transmission employing a single gear shift lever, the wall of the housing being broken away to show the details of the gears, the latter being in their neutral position.

Figure 3 is a diagrammatic view of the shafts

2 and gears of the mechanism with three of the shafts lying in the same plane in order to more clearly illustrate the position of the gears in one of the forward speeds.

Figure 2:
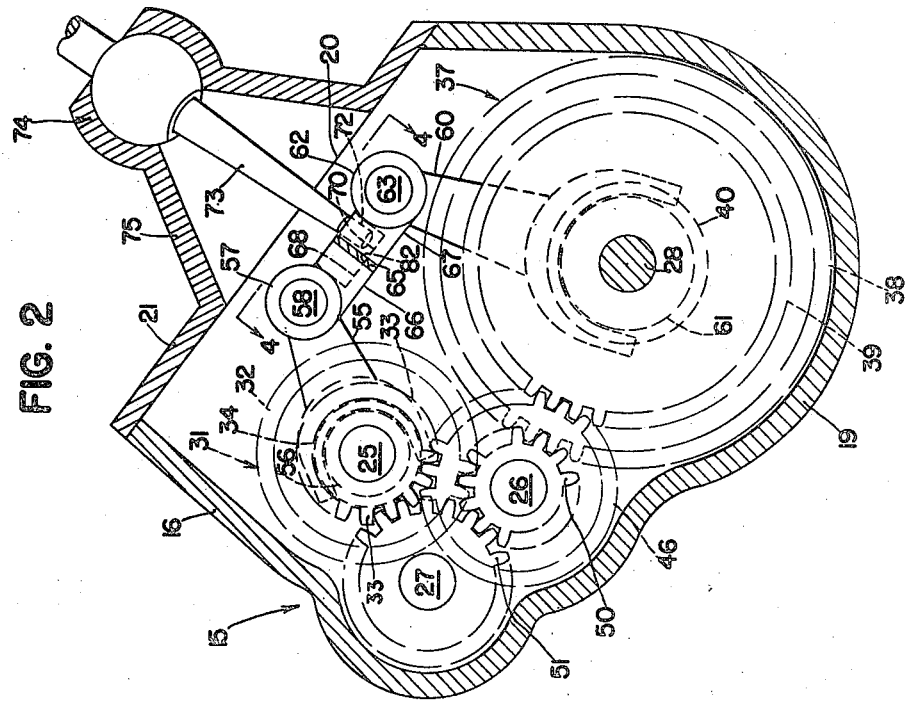
Figure 2 is a rear elevational view of the transmission mechanism, with the rear wall cut away to expose the gears.

Figure 4 is a plan view taken along a line 4—4 in Figure 2, showing the gear shifting members and the means for engaging the latter by the control lever.

Figure 5 is a diagrammatic view, similar to Figure 3, but showing the gears set in reverse.

Figure 6 is a plan view, similar to Figure 4, but showing the shifting members in a position corresponding to the position of the gears in Figure 5.

Figure 7 is a plan view of the shifting members in another embodiment of my invention, in which two gear shift levers are used instead of one.

Figure 8 is a plan view showing a guide plate for the two gear shift levers in the modified form of my invention.

Figure 1:
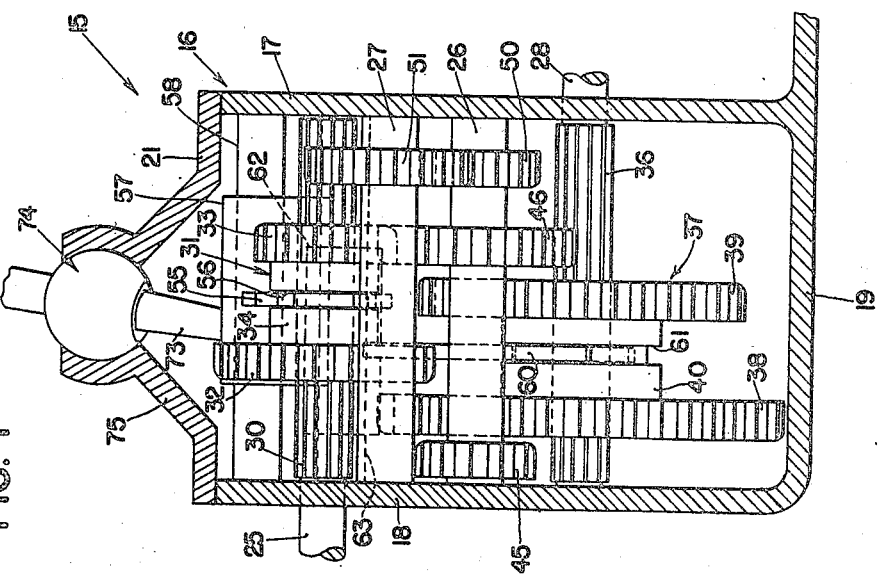

Fig. 9 is a fragmentary side elevational view, similar to the view shown in Figure 1, but employing the two gear shift levers, the gears being omitted to more clearly show the shifting members and the levers; and Figure 10 is a fragmentary rear elevational view, similar to Figure 2, but showing the two gear shift levers and omitting the gears.

Referring now to the drawings, and more particularly to Figures 1 and 2, the transmisson mechanism is indicated in its entirety by the reference numeral 15 and comprises a supporting housing 16 including a pair of front and rear supporting walls 18, 17, lying in parallel planes, and interconnected by a peripherally extending curved housing wall 19, which is provided with an opening 20 in the upper portion thereof, covered by a cover plate 21, which is attached by suitable means (not shown) over the opening 20.

Disposed within the housing 16 are several parallel shafts, namely, a drive shaft 25, a countershaft 26, a reverse shaft 27, and a driven shaft 28. Each of the shafts 25, 26, 27 and 28 is journaled in the two parallel supporting walls 17, 18, in suitable bearings (not shown), and the drive shaft 25 extends through the front wall 18 and is adapted for connection to a suitable driving element, such as a motor (not shown), while the driven shaft 28 is adapted for connection to any suitable driven element, such as the propeller shaft of a vehicle. The countershaft 26 and reverse shaft 27 are disposed wholly within the housing and carried in bearings at opposite ends thereof, respectively.

The drive shaft 25 is provided with splines 30 within the housing 16, on which shaft is slidably mounted a compound gear member 31, which includes a pair of gear elements 32, 33, interconnected by a cylindrical hub member 34, the interior of which is splined to slidably receive the splined portion 30 of the shaft 25 and to prevent relative rotation between the gears 32, 33 and the drive shaft 25.

Similarly, the driven shaft 28 has a splined portion 36 within the housing between the walls 17, 18, and on which is axially slidable a second compound gear member 37, which comprises a pair of axially spaced gear elements 38, 39, interconnected by a cylindrical hub member 40, the interior of which is splined to receive the splined portion 36 of the shaft 28 providing for axial sliding movement but preventing relative rotation therebetween.

The countershaft 26 is provided with a pair of axially spaced gear elements 45, 46, which are rigidly fixed to the shaft 26. The gear 45 is adapted to mesh with the gear element 32 of the compound gear member 31, when the latter is shifted axially toward the left as viewed in Figure 1, on the splined portion 30 of the drive shaft 45. The gear 45 is also adapted to mesh with the gear element 38 of the compound gear 37, when the latter is shifted to the left hand end of the splined portion 36 of the drive shaft 28. As indicated in Figure 2, there is no interference between the gears 38 and 32, so that if desired, both of the latter gears can run in mesh with the gear 45, simultaneously. The other gear 46 on the countershaft 26 is adapted to mesh with the other gear element 33 of the compound gear member 31, when the latter is shifted to the position shown in Figure 1, and the gear 46 is also adapted to mesh with the other gear element 39 of the compound gear member 37 on the driven shaft 28. Since there is no interference between the gears 33 and 39, both of the latter can be disposed in mesh with the gear 46, simultaneously, if desired.

It is now evident that each of the compound gear members 31, 37 can be shifted independently into mesh with either of the gear elements 45 and 46 on the countershaft 26, thus providing four gear ratios between the drive shaft 25 and the driven shaft 28, through the countershaft 26.

A third gear element 50 is provided on the countershaft 26 at one end of the latter outside of the pair of gears 45, 46. This third gear element 50 is disposed in constant meshing relation with a reverse gear 51 which is rigidly fixed to the reverse shaft 27.

The compound gear element 31 can be shifted from the position shown in Figure 1 toward the right until the gear element 33 is disconnected from meshing relation with the gear element 46 and then is shifted into meshing relation with the reverse gear 51. The drive shaft 25 is then connected to the driven shaft 28 through the gear element 33, the reverse gear 51, the third gear element 50, the countershaft 26, and the compound gear member 37, which can be in mesh with either of the pair of gears 45, 46 on the countershaft 26, thereby providing a choice of two gear ratios when driving the driven shaft in reverse direction. It is to be noted that in shifting from one of the forward speeds to a reverse speed, the compound gear member 31 is shifted toward the right, first into meshing relation between the gears 33 and 46, and beyond that position into an outward position in which the gear element 33 meshes with the reverse gear 51, in the position indicated in Figure 5.

The compound gear member 31 on the drive shaft 25 is shifted axially on the splined portion 30, by means of a shifting fork 55, which is bifurcated to engage a peripheral groove 56 in the cylindrical hub 34. The fork 55 is rigidly attached to a shifting member in the form of a yoke or sleeve 57, which is slidable along a supporting rod 58, disposed parallel to the drive shaft 25 and rigidly fixed on opposite ends thereof, respectively, to the front and rear walls 18, 17 of the housing 16.

Similarly, the compound gear member 37 is provided with a shifting fork 60, which is bifurcated to engage a peripheral groove 61 in the cylindrical hub member 40. The shifting fork 60 is rigidly attached to a shifting member in the form of a yoke or sleeve 62 which is slidable longitudinally along a supporting rod 63, mounted rigidly within the housing 16 between the walls 17, 18.

A guide wall 65 is provided in the form of a plate, which extends between the two supporting rods 58, 63, and is rigidly fixed at opposite ends thereof, respectively, to the two supporting walls 17, 18 of the housing 16. The shifting yokes 57, 62 are provided with lateral extensions 66, 67, which extend axially of the sleeves 57, 62 and bear against opposite sides of the wall or plate 65. The top sides of the extensions 66, 67 are recessed adjacent the sides of the plate 65, the extension 66 being provided with a pair of comparatively closely spaced recesses or sockets 68, 69, while the extension 67 is provided with a pair of axially spaced recesses or sockets 70, 71 adjacent the opposite side of the wall 65.

Each of the sockets is adapted to receive the lower end 72 of a gear shift lever 73, which is swingably mounted in a ball and socket joint 74 in an upwardly extending portion 75 of the cover member 21. The upper end of the lever 73 is provided with a suitable handle (not shown) by which the operator can swing the lever 73 about the center of the ball and socket joint 74. Thus, with the lower end 72 of the gear shift lever in any of the sockets or recesses 68, 69, 70, 71, the associated shifting member 57 or 62 can be shifted axially along its associated supporting rod 58 or 63, to shift the respective compound gear member 31 or 37 axially along its splined shaft 30 or 36, respectively. The wall 65 is provided with three longitudinally spaced openings or gates 80, 81, 82, in the form of notches or slots open at the top and equal in depth to the recesses 68, 71, providing for shifting the lower end 72 of the lever 73 from one of the recesses 68, 69 on one side of the plate to one of the recesses 70, 71 on the other side of the plate. Thus, the wall 65 serves as a guide which prevents the control lever 73 from being shifted from one of the shifting members 57, 62 to the other, except when the recess in which the lever is engaged is disposed in proper alignment with one of the gates 80, 81, 82 and with one of the recesses in the other shifting member.

In operation, the four forward speeds are obtained by selectively driving the countershaft 26 at either of two speeds, from the drive shaft 25, and then selecting either of two gear ratios at which to drive the driven shaft 28 from the countershaft 26, the last mentioned selective ratios being obtained at either of the speeds of the countershaft. Hence, the compound gear member 31 on the drive shaft may be considered as a range selector, while the other compound gear member 37 can be considered as a speed selector, by means of which two speeds of the driven shaft 28 can be obtained for each range of speed selected by the range selector 31.

The gears are in neutral position when either or both of the gear members 31, 37 are disposed in a central position between the pair of gears 45, 46 on the countershaft 26. In the neutral position shown in Figure 1, the speed selector 37 is disposed in disconnected position between the two gear elements 45, 46, while the range selector 31 is shifted toward the right to mesh the smaller gear element 33 with the larger gear element 46 on the countershaft 26. In this position the countershaft 26 is rotated during the idling period, which has the advantage of maintaining a flow of lubricating oil over the parts which condition would not exist if the range selector 31 were to be shifted to a disconnected position between the two gears 45, 46, thereby allowing the countershaft 26 to remain stationary. In the neutral position shown in Figure 1, the recesses 70, 71 are disposed in register with the gates 82, 80, respectively, while the recess 68 is disposed in register with the gate 82. The lower end 72 of the control lever 73 is disposed in either of the aligned recesses 68, 70 and can be readily shifted from one to the other through the gate 82. The lowest speed of the driven shaft 28 can then be obtained by shifting the lever 73 into engagement with the recess 70 and moving the shifting member 62 toward the left, thereby shifting the large gear element 38 on the speed selector 37 into engagement with the smaller gear element 45 on the countershaft 26. This connection gives the largest reduction between the drive shaft 25 and the driven shaft 28.

The second forward speed can then be obtained by shifting the selector 62 toward the right into engagement with a stop in the form of a sleeve 85 on the supporting rod 63. In this position of the gears, shown in Figures 3 and 4, the smaller gear element 33 on the range selector 31 is still in mesh with the larger gear element 46 on the countershaft 26, as in the case of the lowest speed combination, while the speed selector 37 has been shifted to the right to engage the smaller gear element 39 with the same gear element 46 on the countershaft 26 with which the range selector gear 33 is engaged.

The third speed connection is obtained by shifting the range selector 31 to its higher range position, and returning the speed selector 37 to its lower speed connection. This is accomplished by shifting the speed selector 37 back to neutral position, thereby realigning the recesses 68, 70 with the gate 82. The lever 73 is then moved into engagement with the recess 68 in the shifting member 57 and the latter is then shifted toward the left to position the recess 68 in register with the gate 80, which in turn is in register with the recess 71 in the shift member 62. This operation has shifted the range selector 31 to the left, meshing the larger gear element 32 with the smaller gear element 45 on the countershaft 26, thereby driving the countershaft at a higher speed. Now, the speed selector 37 is shifted from neutral position to lower speed connection, with the larger gear element 38 shifted into meshing engagement with the smaller gear element 45 on the countershaft 26. This is accomplished by moving the control lever through the gate 80 into the recess 71 and then shifting the shifting member 62 toward the left as far as it will go into engagement with the housing wall 18.

The fourth speed connection is obtained by shifting the lever toward the right, the lower end of the latter being in the recess 71, to shift the shifting member 67 into engagement with the stop sleeve 85, thereby shifting the gear element 39 on the speed selector 37 into engagement with the larger gear element 46 on the countershaft 26.

The reverse connection, shown in Figure 5, can be obtained by first returning to the neutral position of Figure 1. This is accomplished by first shifting the speed selector 37 back to its neutral position, by realigning the recess 71 with the gate 80. The lower end 72 of the lever 73 is then shifted through the gate 80 into the recess 68, then returning the shifting member 57 toward the right to place the recess 68 in register with the gate 82. This returns the range selector 31 to the position shown in Figure 1, in which the smaller gear element 33 is in mesh with the element 46 on the countershaft. In order to obtain the reverse connection of Figures 5 and 6, the gears must first be shifted into the first gear connection, that is to say, the highest gear reduction, by shifting the control lever through the gate 82 into the recess 70 in the shifting element 62, then shifting the latter toward the left as far as it will go, thereby meshing the large gear element 38 with the small gear element 45 on the countershaft. This places the recess 70 in register with the center gate 81, as shown in Figure 6, and at this time the range selector 31 is in mesh with the gear 46 on the countershaft, and has a second recess 69 disposed in register with the center gate 81. The control lever is then shifted from the recess 70 through the gate 81 into the recess 69, after which the shifting member 57 can be slid toward the right into engagement with the wall 17 of the housing, in which position the smaller gear element 33 has been shifted out of engagement with the gear element 46 and into engagement with the reverse gear 51 on the reverse shaft 27. In order to return the transmission mechanism to one of the forward speeds, the range selector 31 is returned to its original position in mesh with the gear element 46, thereby placing the transmission in its lowest speed connection. To return to neutral, the lever is shifted through the gate 81 into the recess 70 and the shifting member 62 is then shifted to a position in which the recess 70 is again in register with the gate 82 and also with the opposite recess 68 in the shifting member 66.

Although the gear change mechanism can be controlled readily with one control lever, as explained above, I prefer to control the gear change mechanism with two levers, one for each of the shifting members 57, 62, for I believe that the operation of the two levers is somewhat easier to comprehend than is the operation with a single lever.

Figures 7-10 inclusive show the control mechanism which employs a pair of control levers 90, 91, swingably mounted on a common pivot member 92 for independent swinging movement about the latter. The lower ends of the control levers 90, 91 are received within a pair of recesses or sockets 93, 94 disposed in the lateral extensions 66, 67 of the shifter member 57, 62, respectively. In this embodiment, the wall 65 is omitted, since the levers remain in their respective sockets at all times. The upper ends of the levers 90, 91 are designated by reference numerals 95, 96, and have suitable handles mounted at their upper extremities (not shown), by means of which the levers can be shifted about the axis of the pivot member 92. The upper portions 95, 96 of the levers are disposed close enough together so that they can be grasped by one hand and shifted simultaneously, when desired. As will be explained later, the levers are shifted simultaneously in the same direction and through equal extents of movement to obtain certain gear changes, while to obtain other gear changes the levers are shifted independently.

The gear mechanism is omitted from Figures 7-10, inclusive, since it is identical with the embodiment shown in Figures 1-6, inclusive. Therefore, the positions of the shifting members 57, 62, as well as the positions of the range and speed selectors 31, 37 are the same, whether they are shifted by one lever or by two levers. The upper portions 95, 96 of the levers 90, 91 move within a pair of slots 97, 98 in a guide plate 99 (see Figure 8). This guide plate is supported by any suitable means (not shown) and the ends of the slots serve as limit stops for the handles of the levers. Inasmuch as the guide plate 99 is located above the pivot axis of the levers while the levers engage the shifting members 57, 62 below the pivot axis, the position of the upper ends of the levers are opposite to the position to the lower ends of the levers. The guide plate 99 in Figure 8 is shown in the position in which it would appear to the operator of a vehicle, such as a tractor or automobile employing a transmission of this type, in which the drive shaft 25 extends forwardly to the engine of the tractor, while the driven shaft 28 extends rearwardly to the rear traction wheels, thereby positioning the end wall 18 of the transmission housing toward the front of the vehicle. With the gears set in neutral as in Figure 1, the levers are positioned as shown in Figure 8, with the upper portion 95 of the range selector control lever moved forwardly to shift the range selector 31 into a position in which the gear element 33 meshes with the gear 46 on the countershaft. The speed selector 37 is set in neutral disconnected position between the countershaft gear elements 45, 46, by placing the upper portion 96 of the lever 91 intermediate the ends of the slot 98, there being a laterally extending notch 100 in the outer side of the slot 98, which definitely positions this lever in neutral.

To shift the gears into the lower speed connection, the handle 96 of the lever 91 is shifted rearwardly in the slot 98 to the rearward end thereof, thereby shifting the speed selector 37 forwardly into mesh with the countershaft gear 45. The handle 96 is sprung slightly in order to bear against the outer edge of the slot 98 in order that it is retained within the notch 100 when in neutral, and therefore to move it rearwardly, it must be forced slightly inwardly to withdraw it from the notch 100.

To shift from first speed to second speed, the handle 96 is pushed forwardly to the forward end of the slot 98, thereby shifting the speed selector 37 rearwardly into mesh with the countershaft gear 46. In each of these speed combinations, namely, neutral, first gear, and second gear, the range selector handle 95 remains at the forward end of the slot 97, and this handle is also sprung toward the right in order to bear against the right hand edge of the slot 97.

To shift from second speed to third speed, the operator grasps both handles 95, 96 and shifts both levers to the rear ends of the slots 97, 98, respectively, thereby shifting the range selector 31 and the speed selector 37 forwardly into mesh with the countershaft gear 45.

To shift from third speed to fourth speed, the handle 96 of the speed selector lever 91 is shifted forwardly to the forward end of the slot 98, thereby shifting the speed selector 37 rearwardly into mesh with the countershaft gear 46, leaving the handle 95 at the rear of the slot 97.

To shift from any of the forward speeds into reverse, the handle 95 is shifted forwardly through a forward extension 101 of the slot 97 to an extreme forward position, thereby shifting the range selector through a position in which the gear element 33 meshes with the countershaft gear 46 to an extreme position in which the gear element 33 meshes with the reverse gear 51. Thus, when shifting from fourth or highest speed to reverse, the range selector 31 moves rearwardly from a position in mesh with the countershaft gear 45 into a position in which the gear element meshes with the countershaft gear 46, but continuing rearwardly out of the last named position into mesh with the reverse gear 51. Since this merely reverses the direction of rotation of the countershaft 26, there are two reverse speeds, one in which the speed selector gear element 38 meshes with the countershaft gear 45 and the other in which the speed selector gear element 39 meshes with the countershaft gear 46, that is to say, the low and high speed reverse connections, respectively. Obviously, the speed selector 37 can be shifted from one of these positions or the other in order to change from the high reverse to the low reverse speed connection, or vice versa, as desired.

Thus, it is now evident that with a total of only eight gears, I can obtain any of four forward speeds or two reverse speed connections, and the transmission mechanism is simple and inexpensive, since it is not complicated by any tubular gear carrying shaft journaled on other gear carrying shafts, as are commonly known in conventional transmission mechanism.

I do not intend my invention to be limited strictly to the details shown and described herein, but only as limited by the claims which follow.

I claim:

1. In power transmitting mechanism, a splined drive shaft, a splined driven shaft parallel thereto, a pair of compound gear members slidable axially on said shafts, respectively, each of said members comprising a pair of axially spaced, interconnected gear elements, a counter shaft disposed parallel to said splined shafts, a pair of axially spaced gear elements fixed on said countershaft and so positioned that the two gear elements of each gear member can be shifted into mesh with the two gear elements of said countershaft, respectively, providing four transmission ratios thereby, by shifting each of said gear members independently in either direction along its respective splined shaft, a third gear element fixed on said countershaft outwardly of said pair of elements thereon, and a reverse gear disposed in mesh with said third gear element and positioned to mesh with one of said gear elements on one of said gear members when said member is shifted outwardly from a position in mesh with one of the pair of gear elements on said countershaft.

2. In power transmitting mechanism, a splined drive shaft, a splined driven shaft parallel thereto, a countershaft disposed parallel to said splined shafts, a pair of axially spaced gear elements fixed on said countershaft, a range selector slidable axially on said drive shaft and comprising a pair of axially spaced, interconnected gear elements adapted to mesh with said gear elements on said countershaft to drive the latter at two different speeds, selectively, a speed selector slidable axially on said driven shaft and comprising a pair of axially spaced, interconnected gear elements adapted to mesh with said gear elements on said countershaft to drive said driven shaft at two different speeds, selectively, at either of said two speeds of said countershaft, providing four gear ratios between said splined shafts in a given direction of rotation, a third gear element fixed on said countershaft, and a reverse gear element meshing with said third gear element, said reverse gear element being positioned to mesh with one of said gear elements on one of said selectors when the latter is shifted axially beyond one of its meshing positions to drive said driven shaft in reverse direction, providing two gear ratios at which said driven shaft can be driven in said reverse direction.

3. In power transmitting mechanism, a splined drive shaft, a splined driven shaft parallel thereto, a countershaft disposed parallel to said splined shafts, a pair of axially spaced gear elements fixed on said countershaft, a range selector slidable axially on said drive shaft and comprising a pair of axially spaced, interconnected gear elements adapted to mesh with said gear elements on said countershaft to drive the latter at two different speeds, selectively, a speed selector slidable axially on said driven shaft and comprising a pair of axially spaced, interconnected gear elements adapted to mesh with said gear elements on said countershaft to drive said driven shaft at two different speeds, selectively, at either of said two speeds of said countershaft, providing four gear ratios between said splined shafts in a given direction of rotation, a third gear element fixed on said countershaft, and a reverse gear element meshing with said third gear element, said reverse gear element being positioned to mesh with one of said gear elements on said range selector when the latter is moved through a position in mesh with one of said countershaft gear elements into mesh with said reverse gear, whereby two ratios of said driven shaft can be obtained in reverse direction by shifting said speed selector between positions in mesh with said pair of countershaft gear elements.

4. In power transmitting mechanism, a first splined shaft, a compound gear member shiftable axially thereon and comprising a pair of axially spaced interconnected gear elements, a second pair of interconnected gear elements rotatable about an axis parallel to said first shaft, said second pair of elements being spaced relative to said gear member to mesh with the latter, selectively, by moving said compound gear member in relatively opposite directions into either of two operating positions, a second splined shaft disposed parallel to said first splined shaft, a second compound gear member shiftable axially thereon and comprising a third pair of gear elements, the latter being adapted to mesh with either of said second pair of gear elements, selectively, by moving said second gear member in relatively opposite directions into either of two operating positions, shifting forks engaging said gear members, respectively, and a pair of control levers mounted in side by side relation and connected with said shifting forks, respectively, for shifting said compound gear members, either simultaneously or independently, to obtain four different gear ratios between said splined shafts.

5. In power transmitting mechanism, a first splined shaft, a compound gear member shiftable axially thereon and comprising a pair of axially spaced interconnected gear elements, a second pair of interconnected gear elements rotatable about an axis parallel to said first shaft, said second pair of elements being spaced relative to said gear member to mesh with the latter, selectively, by moving said compound gear member in relatively opposite directions into either of two operating positions, a second splined shaft disposed parallel to said first splined shaft, a second compound gear member shiftable axially thereon and comprising a third pair of gear elements, the latter being adapted to mesh with either of said second pair of gear elements, selectively, by moving said second gear member in relatively opposite directions into either of two operating positions, said members being shiftable through substantially equal extents of movements, shifting forks engaging said gear members, respectively, and a pair of control levers mounted in side by side relation and connected with said shifting forks, respectively, for shifting said compound gear members, said levers being shiftable simultaneously through coextensive ranges of movement or independently to relatively opposite ends of said ranges to obtain four different gear ratios between said splined shafts.

6. In power transmitting mechanism, a pair of parallel disposed splined shafts, a pair of compound gear members slidable axially on said shafts, respectively, each of said members comprising a pair of axially spaced, interconnected gear elements, a third shaft disposed intermediate said splined shafts and parallel thereto, a pair of axially spaced gear elements fixed on said third shaft and so positioned that the two gear elements of each gear member can be shifted into mesh with the two gear elements on said third shaft, respectively, by shifting each of said gear members independently in either direction along its respective splined shaft, shifting forks engaging said gear members, respectively, and a pair of control levers mounted in side by side relation and connected with said shifting forks, respectively, for shifting said compound gear members, either simultaneously or independently, to obtain four different gear ratios between said splined shafts.

7. In power transmitting mechanism, a first splined shaft, a compound gear member shiftable axially thereon and comprising a pair of axially spaced interconnected gear elements, a second pair of interconnected gear elements rotatable about an axis parallel to said first shaft, said second pair of elements being spaced relative to said gear member to mesh with the latter, selectively, by moving said compound gear member in relatively opposite directions into either of two operating positions, a second spline shaft disposed parallel to said first splined shaft, a second compound gear member shiftable axially thereon and comprising a third pair of gear elements, the latter being adapted to mesh with either of said second pair of gear elements, selectively, by moving said second gear member in relatively opposite directions into either of two operating positions, another gear element rotatably disposed on an axis parallel to said splined shafts adjacent one of said compound gear members, the latter being shiftable from one of said operating positions to a third operating position in which one of the pair of gear elements on that member is in mesh with said other gear element, shifting forks engaging said gear members, respectively, and a pair of control levers mounted in side by side relation and connected with said shifting forks, respectively, for shifting said compound gear members, said levers being shiftable simultaneously or independently.

8. In power transmitting mechanism, a splined drive shaft, a splined driven shaft parallel thereto, a countershaft disposed parallel to said splined shafts, a pair of axially spaced gear elements fixed on said countershaft, a range selector slidable axially on said drive shaft and comprising a pair of axially spaced, interconnected gear elements adapted to mesh with said gear elements on said countershaft to drive the latter at two different speeds, selectively, a speed selector slidable axially on said driven shaft and comprising a pair of axially spaced, interconnected gear elements adapted to mesh with said gear elements on said countershaft to drive said driven shaft at two different speeds, selectively, at either of said two speeds of said countershaft, providing four gear ratios between said splined shafts in a given direction of rotation, a third gear element fixed on said countershaft, and a reverse gear element meshing with said third gear element, said reverse gear element being positioned to mesh with one of said gear elements on one of said selectors when the latter is shifted axially beyond one of its meshing positions to drive said driven shaft in reverse direction, providing two gear ratios at which said driven shaft can be driven in said reverse direction, shifting forks engaging said selectors, respectively, and a pair of control levers pivotally mounted on a common pivot for swinging movement in parallel planes between two positions, either simultaneously or independently to provide four gear ratios in one direction of rotation of said driven shaft, one of said levers being shiftable to a third position to obtain said reverse connection, whereupon said two gear ratios in reverse can be obtained by shifting the other of said levers between said two positions.

9. In power transmitting mechanism, a first splined shaft, a compound gear member shiftable axially thereon and comprising a pair of axially spaced interconnected gear elements, a second pair of interconnected gear elements rotatable about an axis parallel to said first shaft, said second pair of elements being spaced relative to said gear member to mesh with the latter, selectively, by moving said compound gear member in relatively opposite directions into either of two operating positions, a second splined shaft disposed parallel to said first splined shaft, a second compound gear member shiftable axially thereon and comprising a third pair of gear elements, the latter being adapted to mesh with either of said second pair of gear elements, selectively, by moving said second gear member in relatively opposite directions into either of two operating positions, shifting members engaging said gear members, respectively, a control lever movable into engagement with one of said shifting members and shiftable in either direction to shift the associated gear elements into mesh with either of said second pair of elements, respectively, said lever being movable optionally into engagement with the other of said shifting members for shifting the other gear member independently into mesh with either of said second pair of elements.

10. In power transmitting mechanism, a first splined shaft, a compound gear member shiftable axially thereon and comprising a pair of axially spaced interconnected elements, a second pair of interconnected gear elements rotatable about an axis parallel to said first shaft, said second pair of elements being spaced relative to said gear member to mesh with the latter, selectively, by moving said compound gear member in relatively opposite directions into either of two operating positions, a second splined shaft disposed parallel to said first splined shaft, a second compound gear member shiftable axially thereon and comprising a third pair of gear elements, the latter being adapted to mesh with either of said second pair of gear elements, selectively, by moving said second gear member in relatively opposite directions into either of two operating positions, a pair of shifting members connected with said gear members, disposed side by side and shiftable axially of the latter, said shifting members having recesses in their adjacent sides, and a control lever engageable with a recess in one of said shifting members for shifting one gear member to either of its operating positions, the other of said members having spaced recesses disposed in register with the two positions of the first mentioned recess and adapted to receive said lever from either of said positions for then shifting said other member in either direction to its two operating positions, selectively.

11. In power transmitting mechanism, a first splined shaft, a compound gear member shiftable axially thereon and comprising a pair of axially spaced interconnected gear elements, a second pair of interconnected gear elements rotatable about an axis parallel to said first shaft, said second pair of elements being spaced relative to said gear member to mesh with the latter, selectively, by moving said compound gear member in relatively opposite directions into either of two operating positions, a second splined shaft disposed parallel to said first splined shaft, a second compound gear member shiftable axially thereon and comprising a third pair of gear elements, the latter being adapted to mesh with either of said second pair of gear elements, selectively, by moving said second gear member in relatively opposite directions into either of two operating positions, a pair of shifting members connected with said gear members, a stationary wall between said shifting members and along which the latter are slidable axially of the gear members, said shifting members having recesses in their adjacent sides, and a control lever engageable with a recess in one of said shifting members for shifting one gear member to either of its operating positions, said wall having gates disposed in register with the two positions of the recess, there being a pair of recesses in the other of said shifting members disposed in register with said gates when the associated gear member is in a central disconnected position, whereby said control lever can be shifted through the adjacent gate from said recess in said one shifting member in either of its operating positions, into engagement with one of said pair of recesses for shifting the latter along said wall in either direction, selectively.

12. In power transmitting mechanism, a splined drive shaft, a splined driven shaft parallel thereto, a countershaft disposed parallel to said splined shafts, a pair of axially spaced gear elements fixed on said countershaft, a range selector slidable axially on said drive shaft and comprising a pair of axially spaced, interconnected gear elements adapted to mesh with said gear elements on said countershaft to drive the latter at two different speeds, selectively, a speed selector slidable axially on said driven shaft and comprising a pair of axially spaced, interconnected gear elements adapted to mesh with said gear elements on said countershaft to drive said driven shaft at two different speeds, selectively, at either of said two speeds of said countershaft, providing four gear ratios between said splined shafts in a given direction of rotation, a third gear element fixed on said countershaft, and a reverse gear element meshing with said third gear element, said reverse gear element being positioned to mesh with one of said gear elements on said range selector when the latter is moved through a position in mesh with one of said countershaft gear elements into mesh with said reverse gear, a pair of shifting members connected with said gear members, respectively, disposed side by side and shiftable axially of the latter, said shifting members having recesses in their adjacent sides, and a control lever engageable with said recesses and shiftable from a recess in said range selector shifting member from either of its operating positions to one of a pair of recesses in said speed selector shifting member which register with said recess in the respective position thereof, said speed selector being then shiftable by said lever to either of its speed selecting positions, another of said recesses in said range selector shifting member being positioned to register with a recess in said speed selector shifting member in one of the speed selecting positions of the latter, to receive said lever therefrom, whereby said range selector can then be shifted by said lever to mesh with said reverse gear.

13. In power transmitting mechanism of the class described, a pair of shifting members positioned side by side for independent sliding movement, said members having recesses in their adjacent sides, a control lever engageable with one of said recesses for shifting one of said members in either direction to a pair of opposite operating positions, the recesses in the other of said members being spaced to register with the first mentioned recess in the two operating positions of the first said member, respectively, said other member then being shiftable by said lever in either direction to a pair of opposite operating positions, there being a second recess in said one member disposed in register with one of the recesses in said other member to receive said control lever therefrom when said members have each been shifted to a certain pair of operating positions, thereby permitting said one member to be shifted to an extreme operating position beyond said two operating positions thereof.

14. In power transmitting mechanism of the class described, a pair of shifting members positioned side by side for independent sliding movement, a wall disposed between said members having a pair of spaced gates therein, said members having recesses in their adjacent sides, a control lever engageable with a recess in one of said members to shift the latter to either of two operating positions with said recess in register with one of said gates, respectively, the other member having recesses spaced to register with said gates, respectively, to receive said lever therethrough, whereby said other member can then be shifted by said lever to either of two operating positions, there being a third gate in said wall and a second recess in said one member adapted to register in one of said positions of said one member, in a position in register with one of the recesses, in the other member when the latter is shifted into one of its operating positions with the lever in the last mentioned recess, whereby said lever can be moved through said third gate into said second recess to shift said one member to a third operating position.

FRANK T. COURT.

REFERENCES CITED

The following references are of record in the file of this patent:

UNITED STATES PATENTS

| Number | Name | Date |
|---|---|---|
| 1,149,515 | Hinchman | Aug. 10, 1915 |
| 1,756,917 | Tenney | Apr. 29, 1930 |
| 1,817,036 | Kearney et al. | Aug. 4, 1931 |
| 2,315,808 | Miller | Apr. 6, 1943 |
| 2,334,958 | Rohkar | Nov. 23, 1943 |